US008806460B2

(12) United States Patent
Vick

(10) Patent No.: US 8,806,460 B2
(45) Date of Patent: Aug. 12, 2014

(54) METHOD AND APPARATUS FOR AVOIDING REGISTER INTERFERENCE

(75) Inventor: Christopher A. Vick, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 13/358,863

(22) Filed: Jan. 26, 2012

(65) Prior Publication Data

US 2013/0198728 A1 Aug. 1, 2013

(51) Int. Cl.
*G06F 9/45* (2006.01)
*G06F 12/02* (2006.01)

(52) U.S. Cl.
USPC ........................................................ 717/148

(58) Field of Classification Search
None
See application file for complete search history.

(56) References Cited

U.S. PATENT DOCUMENTS

| 5,790,862 | A | 8/1998 | Tanaka et al. |
| 6,421,824 | B1 | 7/2002 | Click, Jr. et al. |
| 7,174,546 | B2 | 2/2007 | Koseki et al. |
| 2004/0010784 | A1 | 1/2004 | Koseki et al. |
| 2008/0134151 | A1 | 6/2008 | Koseki et al. |
| 2009/0064112 | A1 | 3/2009 | Inagaki et al. |

OTHER PUBLICATIONS

Peixotto, David M., "Tuning a Priority-Based Register Allocator Using Adaptive Compilation," Thesis, Rice University, Houston, Dec. 2007.

Ahn M et al., "Fast Code Generation for Embedded Processors with Aliased Heterogeneous Registers", Jan. 1, 2009, Transactions on High-Performance Embedded Architectures and Compilers I I , Springer Berlin Heidelberg, Berlin, Heidelberg, pp. 149-172, XP019116122.
Chow F C et al., "The Priority-Based Coloring Approach to Register Allocation", ACM Transactions on Programming Languages and Systems, New York, NY, US, vol. 12, No. 4, Oct. 1, 1990, pp. 501-536, XP000255876.
Cooper K D et al., "How to Build an Interference Graph", Software Practice & Experience, Wiley & Sons, Bognor Regis, GB, vol. 28, No. 4, Apr. 10, 1998, pp. 425-444, XP000739313.
International Search Report and Written Opinion—PCT/US2013/020646—ISA/EPO—Apr. 10, 2013.
Liem C et al., "Register Assignment Through Resource Classification for ASIP Microcode Generation", IEEE/ACM International Conference on Computer-Aided Design. Digest of Technical Papers (ICCAD). San Jose, Nov. 6-10, 1994; [IEEE/ACM International Conference on Computer-Aided Design. Digest of Technical Papers (ICCAD)], Los Alamitos, IEEE Comp. So, Nov. 6, 1994, pp. 397-402, XP010252250.
Lueh GY et al., "Call-Cost Directed Register Allocation, Proceedings of the 2004 ACM LCTES'04", ACM Press, New York, New York, USA, vol. 32, No. 5, May 1, 1997, pp. 296-307, XP000655929.

*Primary Examiner* — Li B Zhen
*Assistant Examiner* — Joanne Macasiano
(74) *Attorney, Agent, or Firm* — Nicholas A. Cole

(57) ABSTRACT

The aspects enable a computing device to allocate memory space to variables during runtime compilation of a software application. A first variable associated with a code segment within code being compiled may be identified and assigned a priority tag. A second variable associated with another code segment within the code being compiled may also be assigned a priority tag. A determination may be made regarding whether the first and second variables are contemporaneously live during execution, and whether legal storage location sets for the first and second variables overlap. The assigned priority tags may be used for assigning storage locations to the first and second variables based on the determination.

32 Claims, 6 Drawing Sheets

METHOD AND APPARATUS FOR AVOIDING REGISTER INTERFERENCE

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. With this increase in processing speed, usage, and performance, there is an increased demand for improving the efficiency and processing speed of the mobile devices, which may be achieved via faster and more sophisticated compilers and compiling frameworks.

Generally, application software written for mobile computing devices is compiled into executable code which is what users refer to as "applications." Developers typically use a compiler to translate code written in higher level programming languages into executable code suitable for target mobile computing devices. Application software may be distributed as pure executable code, in which case the compiling step is typically performed by the developer on what is referred to as a "static compiler." Application software may also be written so portions of the code are compiled at runtime using software modules within the mobile computing device referred to as a "runtime compiler." Runtime compilers (e.g., dynamic compilers or Just in Time compilers) translate segments of code into executable native code (e.g., machine code) at the time the code is executed.

SUMMARY

The various aspects include methods of allocating storage locations to variables while compiling code for a computing system, which may include identifying a first variable associated with a code segment within code being compiled, assigning a first priority tag to the first variable, identifying a second variable associated with another code segment within the code being compiled, assigning a second priority tag to the second variable, and using the assigned priority tags in assigning storage locations to the first and second variables. In an aspect, using the assigned priority tags in assigning storage locations to the first and second variables includes determining whether the first and second variable are contemporaneously live during execution of the compiled code, and determining whether legal storage location sets for the first and second variables overlap when it is determined that the first and second variable are contemporaneously live during execution of the compiled code. In a further aspect, using the assigned priority tags in assigning storage locations to the first and second variables further includes using the assigned priority tags to either assign a new legal set of storage locations to one or both of the first and second variables or to determine that an interference edge should be added to an interference graph. In a further aspect, using the assigned priority tags in assigning storage locations to the first and second variables further includes comparing the priority tags assigned to each of the first and second variables when it is determined that the first and second variables are contemporaneously live during execution of the compiled code and have overlapping legal storage location sets. In a further aspect, the method includes inserting an interference edge in an interference graph, and proceeding with compiler operations when the first and second variables both have low priority tags. In a further aspect, the method includes subtracting the legal storage location set of the higher priority variable from the legal storage location set to obtain a remainder set of storage locations when the first and second variables have different priority tags, determining whether the remainder set is empty, assigning the remainder set to the variable with the lower priority tag as a new legal parameter set, and proceeding with the compiler operations when the remainder set of storage locations is not empty, and inserting an interference edge in an interference graph, and proceeding with the compiler operations when the remainder set of storage locations is empty. In a further aspect, the method includes determining an intersection set of legal storage locations common to both the first and second variables when the first and second variables both have high priority tags, and partitioning the intersection set of legal storage locations approximately equally between the first and second variables into a first partition set for the first variable and a second partition set for the second variable. In a further aspect, the method includes subtracting the first partition set from the legal partition set of the second variable to obtain a first remainder set, subtracting the second partition set from the legal partition set of the first variable to obtain a second remainder set, determining whether the first remainder set is empty, and determining whether the second remainder set is empty. In a further aspect, the method includes inserting an interference edge in an interference graph and proceeding with the compiler operations when either of the first or second remainder sets is empty. In a further aspect, the method includes assigning the first remainder set to the first variable as a new legal storage location set, assigning the second remainder set to the first variable as a new legal storage location set, and proceeding with the compiler operations when both of the first and second remainder sets are not empty. In a further aspect, identifying a first variable associated with a code segment within code being compiled includes identifying a first variable associated with a code segment within code being compiled by a runtime compiler. In a further aspect, identifying a first variable associated with a code segment within code being compiled includes identifying a first variable associated with a code segment within code being compiled by a static compiler.

Further aspects include a computing device configured to allocate storage locations to variables while compiling code that includes a memory, a processor, means for identifying a first variable associated with a code segment within code being compiled, means for assigning a first priority tag to the first variable, means for identifying a second variable associated with another code segment within the code being compiled, means for assigning a second priority tag to the second variable, and means for using the assigned priority tags in assigning storage locations to the first and second variables. In an aspect, means for using the assigned priority tags in assigning storage locations to the first and second variables includes means for determining whether the first and second variable are contemporaneously live during execution of the compiled code, and means for determining whether legal storage location sets for the first and second variables overlap when it is determined that the first and second variable are contemporaneously live during execution of the compiled code. In a further aspect, means for using the assigned priority tags in assigning storage locations to the first and second variables further includes means for using the assigned priority tags to either assign a new legal set of storage locations to one or both of the first and second variables or to determine that an interference edge should be added to an interference graph. In a further aspect, means for using the assigned priority tags in assigning storage locations to the first and second variables further includes means for comparing the priority tags assigned to each of the first and second variables when it is determined that the first and second variables are contemporaneously live during execution of the compiled code and have overlapping legal storage location sets. In a further aspect, the computing device includes means for inserting an interference edge in an interference graph and proceeding with compiler operations when the first and second variables both have low priority tags. In a further aspect, the computing device includes means for subtracting the legal storage location set of the higher priority variable from the legal storage location set to obtain a remainder set of storage locations when the first and second variables have different priority tags, means for determining whether the remainder set is empty, means for assigning the remainder set to the variable with the lower priority tag as a new legal parameter set and proceeding with the compiler operations when the remainder set of storage locations is not empty, and means for inserting an interference edge in an interference graph and proceeding with the compiler operations when the remainder set of storage locations is empty. In a further aspect, the computing device includes means for determining an intersection set of legal storage locations common to both the first and second variables when the first and second variables both have high priority tags, and means for partitioning the intersection set of legal storage locations approximately equally between the first and second variables into a first partition set for the first variable and a second partition set for the second variable. In a further aspect, the computing device includes means for subtracting the first partition set from the legal partition set of the second variable to obtain a first remainder set, means for subtracting the second partition set from the legal partition set of the first variable to obtain a second remainder set, means for determining whether the first remainder set is empty, and means for determining whether the second remainder set is empty. In a further aspect, the computing device includes means for inserting an interference edge in an interference graph and proceeding with the compiler operations when either of the first or second remainder sets is empty. In a further aspect, the computing device includes means for assigning the first remainder set to the first variable as a new legal storage location set, means for assigning the second remainder set to the first variable as a new legal storage location set, and means for proceeding with the compiler operations when both of the first and second remainder sets are not empty. In a further aspect, means for identifying a first variable associated with a code segment within code being compiled includes means for identifying a first variable associated with a code segment within code being compiled by a runtime compiler. In a further aspect, means for identifying a first variable associated with a code segment within code being compiled includes means for identifying a first variable associated with a code segment within code being compiled by a static compiler.

Further aspects include a non-transitory computer readable storage medium having stored thereon processor-executable software instructions configured to cause a processor to perform operations for allocating storage locations to variables while compiling code, the operations including identifying a first variable associated with a code segment within code being compiled, assigning a first priority tag to the first variable, identifying a second variable associated with another code segment within the code being compiled, assigning a second priority tag to the second variable, and using the assigned priority tags in assigning storage locations to the first and second variables. In an aspect, the stored processor-executable instructions are configured to cause a processor to perform operations such that using the assigned priority tags in assigning storage locations to the first and second variables includes determining whether the first and second variable are contemporaneously live during execution of the compiled code, and determining whether legal storage location sets for the first and second variables overlap when it is determined that the first and second variable are contemporaneously live during execution of the compiled code. In a further aspect, the stored processor-executable instructions are configured to cause a processor to perform operations such that using the assigned priority tags in assigning storage locations to the first and second variables further includes using the assigned priority tags to either assign a new legal set of storage locations to one or both of the first and second variables or to determine that an interference edge should be added to an interference graph. In a further aspect, the stored processor-executable instructions are configured to cause a processor to perform operations such that using the assigned priority tags in assigning storage locations to the first and second variables further includes comparing the priority tags assigned to each of the first and second variables when it is determined that the first and second variables are contemporaneously live during execution of the compiled code and have overlapping legal storage location sets. In a further aspect, the stored processor-executable instructions are configured to cause a processor to perform operations further including inserting an interference edge in an interference graph and proceeding with compiler operations when the first and second variables both have low priority tags. In a further aspect, the stored processor-executable instructions are configured to cause a processor to perform operations further including subtracting the legal storage location set of the higher priority variable from the legal storage location set to obtain a remainder set of storage locations when the first and second variables have different priority tags, determining whether the remainder set is empty, assigning the remainder set to the variable with the lower priority tag as a new legal parameter set and proceeding with the compiler operations when the remainder set of storage locations is not empty, and inserting an interference edge in an interference graph and proceeding with the compiler operations when the remainder set of storage locations is empty. In a further aspect, the stored processor-executable instructions are configured to cause a processor to perform operations further including determining an intersection set of legal storage locations common to both the first and second variables when the first and second variables both have high priority tags, and partitioning the intersection set of legal storage locations approximately equally between the first and second variables into a first partition set for the first variable and a second partition set for the second variable. In a further aspect, the stored processor-executable instructions are configured to cause a processor to perform operations further including subtracting the first partition set from the legal partition set of the second variable to obtain a first remainder set, subtracting the second partition set from the legal partition set of the first variable to obtain a second remainder set, determining whether the first remainder set is empty, and determining whether the second remainder set is empty. In a further aspect, the processor is configured with processor-executable instructions to perform operations further including inserting an interference edge in an interference graph, and proceeding with the compiler operations when either of the first or second remainder sets is empty. In a further aspect, the stored processor-executable instructions are configured to cause a processor to perform operations further including assigning the first remainder set to the first variable as a new legal storage location set, assigning the second remainder set to the first variable as a new legal storage location set, and proceeding with the compiler operations when both of the first and second remainder sets are not empty. In a further aspect, the stored processor-executable instructions are configured to cause a processor to perform operations such that identifying a first variable associated with a code segment within code being compiled includes identifying a first variable associated with a code segment within code being compiled by a runtime compiler. In a further aspect, the stored processor-executable instructions are configured to cause a processor to perform operations such that identifying a first variable associated with a code segment within code being compiled includes identifying a first variable associated with a code segment within code being compiled by a static compiler.

Further aspects include a computing device, including a memory, and a processor coupled to the receiver and the memory, wherein the processor is configured with processor-executable instructions to perform operations including identifying a first variable associated with a code segment within code being compiled, assigning a first priority tag to the first variable, identifying a second variable associated with another code segment within the code being compiled, assigning a second priority tag to the second variable, and using the assigned priority tags in assigning storage locations to the first and second variables. In an aspect, the processor is configured with processor-executable instructions to perform operations such that using the assigned priority tags in assigning storage locations to the first and second variables includes determining whether the first and second variable are contemporaneously live during execution of the compiled code, and determining whether legal storage location sets for the first and second variables overlap when it is determined that the first and second variable are contemporaneously live during execution of the compiled code. In a further aspect, the processor is configured with processor-executable instructions to perform operations such that using the assigned priority tags in assigning storage locations to the first and second variables further includes using the assigned priority tags to either assign a new legal set of storage locations to one or both of the first and second variables or to determine that an interference edge should be added to an interference graph. In a further aspect, the processor is configured with processor-executable instructions to perform operations such that using the assigned priority tags in assigning storage locations to the first and second variables further includes comparing the priority tags assigned to each of the first and second variables when it is determined that the first and second variables are contemporaneously live during execution of the compiled code and have overlapping legal storage location sets. In a further aspect, the processor is configured with processor-executable instructions to perform operations further including inserting an interference edge in an interference graph and proceeding with compiler operations when the first and second variables both have low priority tags. In a further aspect, wherein the processor is configured with processor-executable instructions to perform operations further including subtracting the legal storage location set of the higher priority variable from the legal storage location set to obtain a remainder set of storage locations when the first and second variables have different priority tags, determining whether the remainder set is empty, assigning the remainder set to the variable with the lower priority tag as a new legal parameter set and proceeding with the compiler operations when the remainder set of storage locations is not empty, and inserting an interference edge in an interference graph and proceeding with the compiler operations when the remainder set of storage locations is empty. In a further aspect, the processor is configured with processor-executable instructions to perform operations further including determining an intersection set of legal storage locations common to both the first and second variables when the first and second variables both have high priority tags, and partitioning the intersection set of legal storage locations approximately equally between the first and second variables into a first partition set for the first variable and a second partition set for the second variable. In a further aspect, the processor is configured with processor-executable instructions to perform operations further including subtracting the first partition set from the legal partition set of the second variable to obtain a first remainder set, subtracting the second partition set from the legal partition set of the first variable to obtain a second remainder set, determining whether the first remainder set is empty, and determining whether the second remainder set is empty. In a further aspect, the processor is configured with processor-executable instructions to perform operations further including inserting an interference edge in an interference graph and proceeding with the compiler operations when either of the first or second remainder sets is empty. In a further aspect, the processor is configured with processor-executable instructions to perform operations further including assigning the first remainder set to the first variable as a new legal storage location set, assigning the second remainder set to the first variable as a new legal storage location set, and proceeding with the compiler operations when both of the first and second remainder sets are not empty. In a further aspect, the processor is configured with processor-executable instructions such that identifying a first variable associated with a code segment within code being compiled includes identifying a first variable associated with a code segment within code being compiled by a runtime compiler. In a further aspect, the processor is configured with processor-executable instructions such that identifying a first variable associated with a code segment within code being compiled includes identifying a first variable associated with a code segment within code being compiled by a static compiler.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
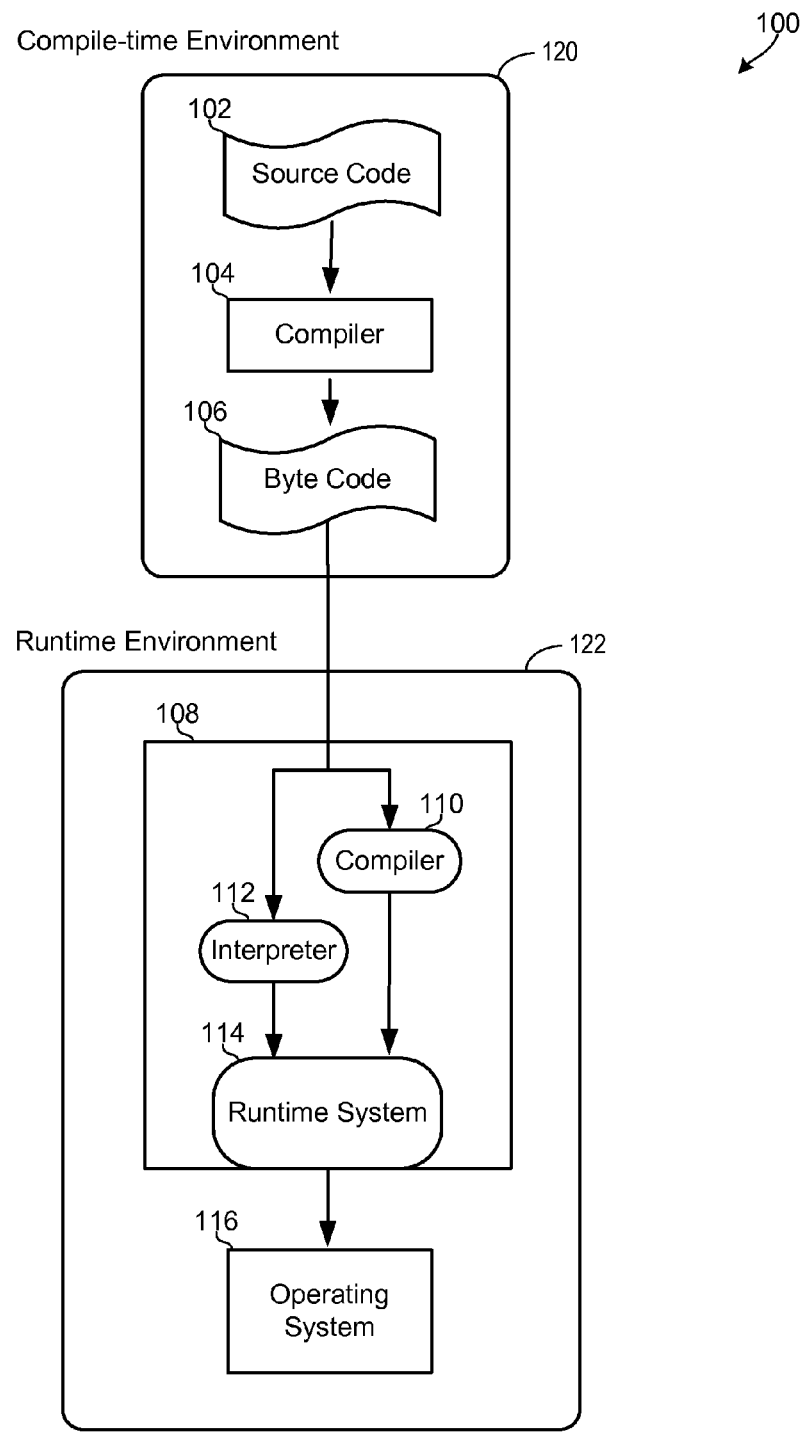
FIG. 1 is an architectural diagram illustrating information flows in a computing system suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device" and "receiver device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for compiling applications run on mobile computing devices, such as smartphone, which have limited memory and processing power, the aspects are generally useful in any compiler used to compile application software for computing devices that include a processor and execute application programs.

The phrases "legal set" and "legal register set" are used interchangeably herein to refer to a set of registers in the computing device which a particular variable is allowed to use. Some operations may place restrictions on the types or identity of registers that may be used, while other operations may place no restrictions on the registers (i.e., any available register may be used).

The various aspects provide compiler methods for preventing code segment variables (referred to as "values" or "value data structures") from competing for the same storage locations and for managing value-register conflicts. Various aspects implement methods that generate smaller and more efficient interference graphs for all instruction set architectures, including those which do not include instructions that are limited to a single register (e.g., ARM). Various aspects generate interference graphs having a reduced number of interference edges, which reduces memory usage and improves the speed of execution of the compiler software.

Register allocation is a compiler process that assigns variables to hardware registers during program execution. Assigning variables to hardware registers is an important compiler optimization because a device processor is able to access variables assigned to hardware registers much faster than variables stored in non-register memories. It is common for a compiler process to generate more variables than there are available hardware registers on a typical mobile computing device. To address such scenarios, multiple variables may be assigned to a single register and/or the variables may be "spilled" to (i.e., stored in) alternative locations, such as cache memory, disk storage, etc. These operations add computational complexities to the compiler process of assigning the variables to hardware registers and reduce the overall speed of the computing device by increasing the overall compile time of the runtime compiler and by increasing the runtime of the generated code. That is, since the runtime compiler performs these compile operations during the program's execution, such increases in compile time greatly impact the user experience by occupying and slowing down the mobile device processors. The various aspects provide improved register allocation techniques that significantly reduce the overall compile time and greatly improve the efficiency and performance of mobile device processors.

Generally, register allocation processes allocate variables to hardware registers by implementing graph coloring methodologies that utilize interference graphs. An interference graph is a data-structure that may be used to determine the safety of certain software operations, and identify conflicts between two or more virtual registers. Specifically, interference graphs enable the runtime compiler to identify situations in which two or more values are likely to compete for storage at the same time (i.e., are alive at the same time) and manage the allocation of these values accordingly.

Due to the above-mentioned computational complexities, existing register allocation solutions may result in large and complex interference graphs. Since the runtime compiler allocates the registers at runtime (e.g., during the execution of an application program), the amount of time required to construct and manipulate these complex graphs may become prohibitive by driving up the total compilation time. The various aspects reduce the total compilation time by constructing and tuning interference graphs efficiently. The various aspects minimize the size and complexity of the interference graphs utilized by the register allocation processes. These smaller and more efficient interference graphs enable the runtime compiler to allocate registers faster and more efficiently, reducing the overall compile time and improving processor performance.

The various aspects may be implemented in a wide variety of systems and architectures, an example of which is illustrated in FIG. 1. Specifically, FIG. 1 illustrates information flows through an example virtual machine 108 of a computing system 100 suitable for implementing the various aspects. In the illustrated example, when a computer program is executed, source code 102 written in a high level language is provided to a compiler module 104 within a compile-time environment 120, which translates the source code 102 into a virtual instruction set architecture (Virtual ISA code) and/or byte code 106. The source code 102 may be translated into the byte code 106 at the time source code 102 is created by a software developer. The generated byte code 106 may be generated such that it may be distributed to a wide variety of mobile devices having different platforms and execution environments, so long as the mobile devices supports the ISA used to generate the bytecode 106 (i.e., the generated byte code 106 may be platform independent).

The computing system 100 may also include a runtime environment 122 that includes a virtual machine 108 and an operating system 116. The virtual machine 108 may be a software application that executes application programs like a physical hardware machine. The virtual machine 108 may provide an interface between the application programs and the physical hardware, potentially allowing application programs tied to a specific instruction set architecture (ISA) to execute on hardware implementing a different instruction set architecture. In the illustrated example of FIG. 1, the virtual machine 108 includes a runtime compiler 110, an interpreter 112, and a runtime system 114.

Byte code 106 generated by the compile time environment 120 may be provided to the either the runtime compiler 110 or the interpreter 112 of the virtual machine 108. If the byte code 106 is provided to the compiler 110, the methods and procedures stored by the byte codes may be compiled into machine instructions, whereas if the byte code 106 is provided to the interpreter 112, the byte code may be read and executed "as is." Thus, when requests (e.g., method calls) are issued to the operating system 116, the runtime system 114 may determine whether the request requires an interpreted method or a compiled method. If a compiled method is required, the runtime system 114 may activate the runtime compiler 110, which compiles the received byte code 106 to generate, at runtime, an optimized set of machine instructions for the execution. As part of these operations, the runtime compiler 110 may perform register allocation operations that assign variables to the physical hardware registers, which in existing solutions requires either the generation of large and complex interference graphs or the use of specific instruction sets (e.g., (e.g., x86 or IA-32 microprocessor architecture) that include a large number of operations that operate on a single register, which is discussed in detail further below.

Figure 2:
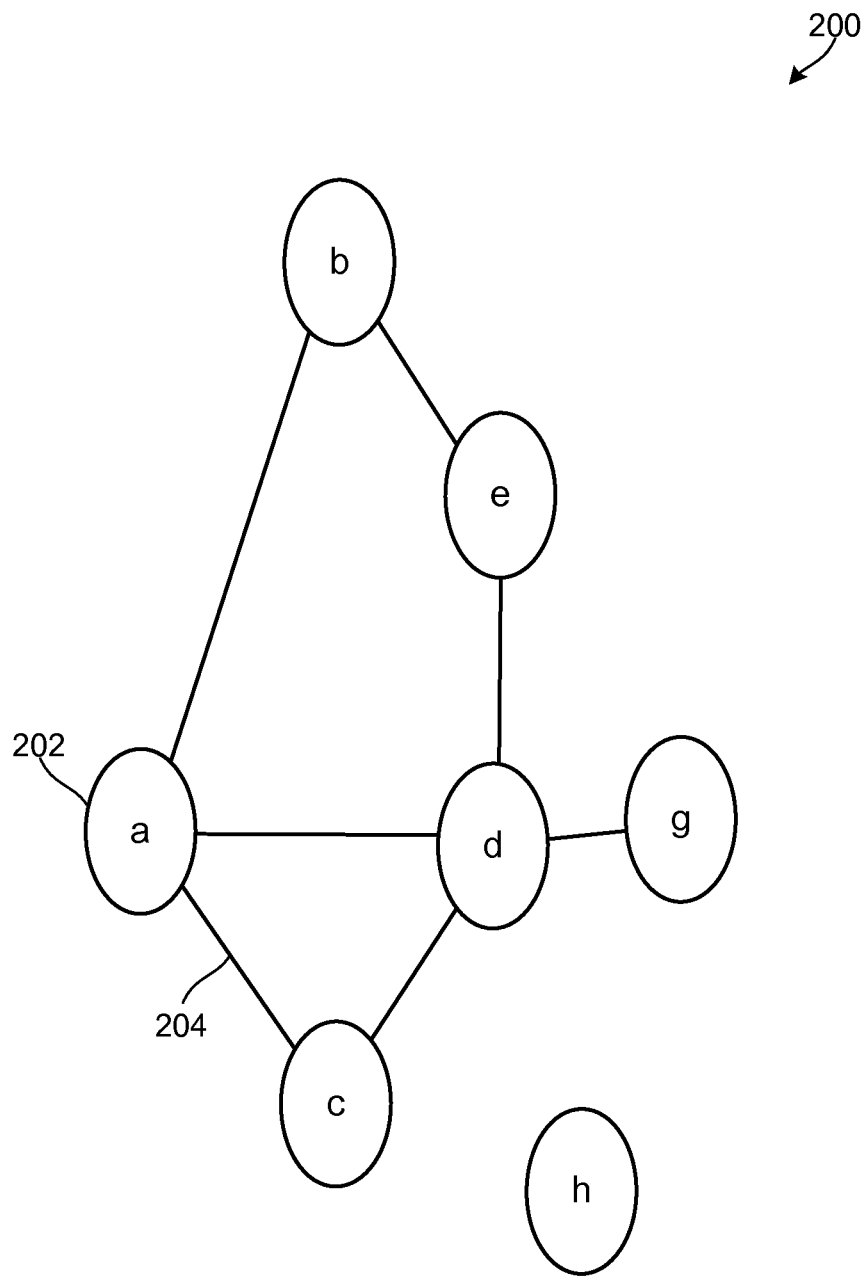
FIG. 2 is an illustration of an example interference graph suitable for use with the various aspects.

FIG. 2 illustrates an example interference graph 200 suitable for use with the various aspects. As mentioned above, a register allocator module may control the use of registers within an optimized or otherwise compiled program by allocating the register space in which data associated with the program may be stored. A register is a location associated with a processor that may be accessed faster than the other memories (e.g., stack, heap, etc.) available to the processor. To allocate such registers, the register allocator module may generate an interference graph, which is a data-structure that provides a representation of the live ranges of the variables associated with a particular portion of code. A live range is a range in a portion of code over which a particular variable or value must remain accessible and available for use.

The interference graph 200 identifies conflicts between virtual registers through the use of nodes 202, colors, and edges 204. Each virtual register may be represented by a node 202 in the graph (e.g., nodes a-h), and physical registers may be represented by a color (not illustrated). If two virtual registers are both live (i.e., are both being operated on) at the same point in the program, their nodes may be connected with an edge 204. Thus, the nodes 202 in the graph may represent values that need storage locations (registers), and the edges 204 may represent scenarios in which two nodes need a storage location at the same time (i.e., their live ranges overlap). If two variables do not interfere (i.e., there is no edge between their respective nodes in the interference graph), then the same register may be used for both variables (e.g., for nodes a and g), reducing the number of registers needed. If two nodes are adjacent (e.g., nodes a and c) due to the sharing of an edge 204, the live ranges of the variables overlap, and the register allocator module may determine that each of these variables should be assigned a different color (and thus allocated to different physical register) than the other variables.

As mentioned above, edges between two nodes in the interference graph indicate that the two nodes interfere, and that the variables associated with the two nodes may not be stored in the same register. As the number of edges increases, the interference graph grows larger and more complex. For example, in a typical bit-set implementation, the interference graph may have thousands of edges and each edge may require eight bytes of storage. In addition, the process of creating and modifying these interference graphs may encompass a substantial part of an overall compilation process.

The size and complexity of the interference graphs may be reduced by exploiting the features of certain instruction set architectures. For example, in some instruction set architectures (e.g., x86 or IA-32 microprocessor architecture), certain operations only operate on a single register. An example of this is the divide instruction in the x86 instruction set, which is only capable of producing a result in the EAX (a register on the IA-32 microprocessor architecture). Since the results of the divide operation cannot be stored in any register other than the EAX register, whenever a program includes a divide instruction, the register allocator may conclude that the EAX register is effectively occupied and the other values should not have access to EAX register.

On such systems, two values only compete with one another if they are alive at the same time and can use exactly the same registers. For example, on x86 systems, floating-point operations must operate out of the floating-point registers and the integer operations must operate out of the integer registers. Therefore, a floating-point operation cannot interfere with an integer operation because they can't be performed from the same registers, and those two values will never compete for the same register. As such, when generating the interference graph, the compiler may improve the device's runtime performance by reducing the number of interferences (edges), which may be achieved on the above-mentioned instruction set architectures (e.g., x86 or IA-32 microprocessor architecture), by acknowledging that interferences will only exist if the live ranges overlap and the set of legal registers that the value could be placed in overlap.

In the presence of operations that must use a specific register (e.g., x86 divide operations that must use the EAX register), instead of determining whether the divide operation interferes with everything else that can be done in the any of the general-purpose registers, the compiler may evaluate the live ranges by first subtracting the EAX register from the legal set of available registers. In this manner, the compiler may reduce the number of edges in the interference graph by acknowledging that (since the divide instruction must have access to get EAX register) such operations ought to be pre-colored to the EAX register, and that EAX register should be removed from consideration (i.e., all non-divide operations should be mapped to registers other than EAX). By subtracting such registers from consideration, the total number of edges in the interference graph may be reduced by a factor of three, and since the speed of the register allocator is directly proportional to the number of edges in the interference graph, processor performance is also improved by a factor of three.

Unlike the instruction set architectures described above (e.g., x86), some instruction set architectures (e.g., ARM) do not include very many instructions that are limited to a single register. For example, in ARM architectures, the instruction set is very "regular" and almost every operation may use exactly the same sets of registers as every other operation. In such architectures (e.g., ARM), the above mentioned techniques for subtracting registers that are legal for a single operation (e.g., divide) from the universe of legal registers prior to the allocation of registers is not as effective as they are on other architectures (e.g., x86), because there are not as many registers that may be subtracted.

The various aspects implement methods that generate smaller and more efficient interference graphs for all instruction set architectures, including those which do not include instructions that are limited to a single register (e.g., ARM). Various aspects provide compiler methods for preventing code segment variables (referred to as "values" or "value data structures") from competing for the same storage locations and for managing value-register conflicts. Various aspects generate interference graphs having a reduced number of interference edges, which reduces memory usage and improves the speed of the register allocator.

Figure 3:
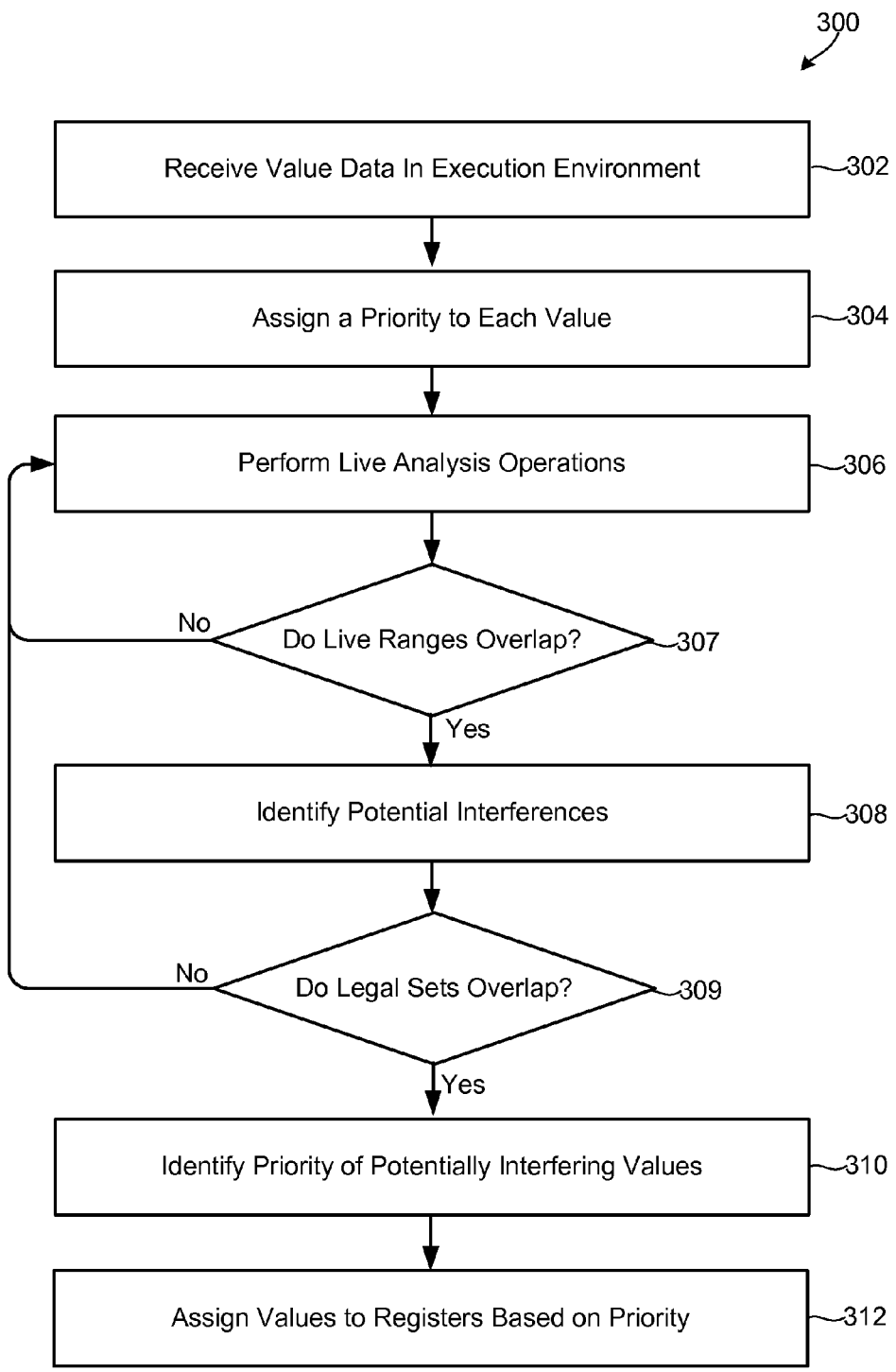
FIGS. 3-4 are process flow diagrams of aspect methods for improving the efficiency, speed, and overall performance of a compiler.

FIG. 3 illustrates an aspect method 300 for assigning priorities to values and generating an interference graph having a reduced number of edges. In block 302, the runtime environment may receive all the variables/values data structures that require an assignment. In block 304, a tag field that specifies a priority (e.g., high, low, etc.) may be added to each of the received value data structures. This priority may reflect the importance or frequency of the value to operations being compiled. The priority tag may also identify value data structure that must be loaded or processed in a particular register (i.e., lacks flexibility in terms of register assignments). Thus, it should be understood that the assignments of priority to variables or value data structures may be accomplished using any of a variety of criteria, examples of which include: assigning a high priority tag to values that are used frequently throughout execution of the code, if the value is necessary for subsequent operations, the value is associated with a critical path or pacing operation (i.e., if it is held up the entire execution is held up), and if the value must be place in a particular one or few registers due to the type of operation.

Returning to FIG. 3, in block 306, live analysis operations may be performed to determine which values are live at which points in the program (e.g., to identify the live ranges). In determination block 307, it may be determined whether the live ranges of the variables overlap. If it is determined that two values are not live at the same time (determination block 307="No"), in block 306, live analysis operations may continue until all the received data has been evaluation.

As mentioned above, two values only compete with one another if they are alive at the same time and can be stored in the same type of registers (share a legal set of locations). Thus, if it is determined that two or more values are live at the same time (determination block 307="Yes"), in block 308, the legal set of locations (i.e., register assignments) for each of the identified values may be compared to identify potential interferences or conflicts. In determination block 309, it may be determined whether the legal sets of locations for the variables overlap. In the event that the legal sets of value data structures overlap, the priority tags of those values may be compared. For example, if it is determined that the two legal sets overlap (determination block 309="Yes"), in block 310 the assigned tags may be compared to identify the priority associated with each value.

If both values are low priority, the method inserts an interference edge in the interference graph data structure. If one of the value data structures is tagged as high priority and the other value data structure is tagged as low priority, the method subtracts the set of legal locations of the high priority value from the set of legal locations for the low priority value.

In block 312, the compiler may generate the interference graph using the priority values. For example, if the compiler determines that both values have a low priority, an interference edge may be inserted into the graph. If one value has a higher priority than the other, the set of legal locations of the higher priority value may be subtracted from the set of legal locations for the lower priority value. If as a result of this subtraction the remaining set is not empty, the remainder becomes the new legal set for the low priority value, and no interference edge is necessary. On the other hand, if the result of the subtraction is that the set is empty, the method inserts an interference edge into the interference graph, and leaves the legal sets unchanged. This leaves the interference to be resolved in the ordinary manner of compilers. In the event that both values are tagged as high priority, the method takes the intersection of legal sets for both value data structures, and then partitions that intersection into sets of roughly even size, and subtracts one partition from one value, and the other partition from the other. If either new legal set becomes empty as a result of this subtraction operation, then the method inserts an interference edge and leaves the legal sets unchanged. This relegates resolution to the ordinary methods of the compiler. If both new sets are not empty as a result of this subtraction, then the method uses the new legal sets, and no interference is necessary. Compilation of the code then proceeds in the ordinary manner.

Figure 4:
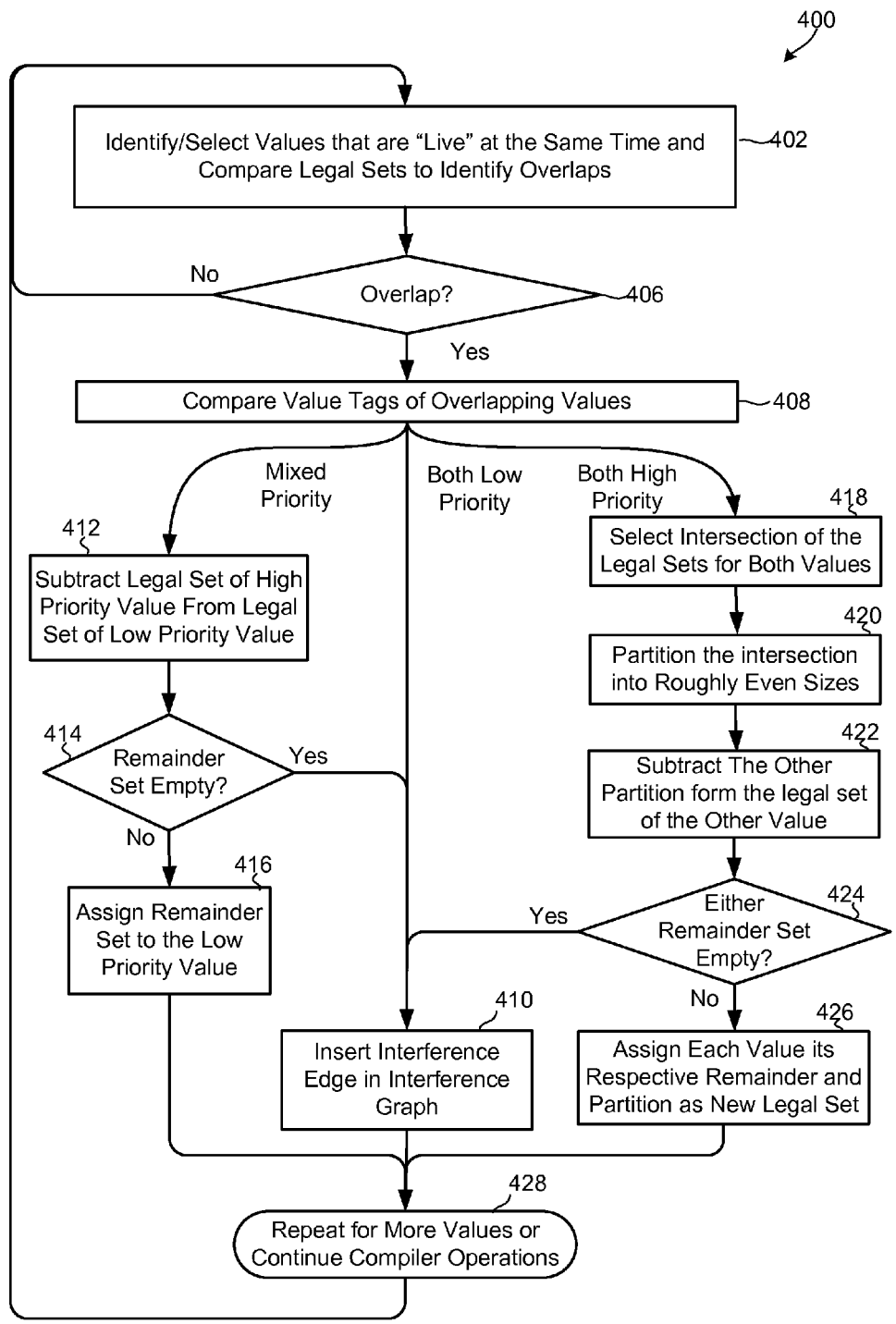

FIG. 4 illustrates an aspect method 400 for processing data value structures for generating an interference graph having a reduced number of edges. In block 402, the compiler may perform live analysis operations to identify the live ranges, and if two or more values are live at the same time compare the legal set of locations (i.e., register assignments) for each of the identified values to identify potential interferences or conflicts, similar to blocks 302-309 illustrated in FIG. 3. If the legal sets do not overlap (determination block 406="No"), in block 402, the remaining portions of the code are evaluated. If the legal sets overlap (determination block 406="Yes"), in block 408 the priority tags of those values may be compared to identify the priority associated with each value structure.

If, in block 408, the compiler determines that both values have a low priority, in block 410 an interference edge may be inserted into the graph. However, if in block 408 the compiler determines that one value has a higher priority than the other, in block 412 the set of legal locations of the higher priority value may be subtracted from the set of legal locations for the lower priority value. In determination block 414, the compiler may determine whether, as a result of this subtraction, the remaining set is empty or not. If the remaining set is empty (determination step 414="Yes"), in block 410, the compiler inserts an interference edge into the interference graph, and leaves the legal sets unchanged. This leaves the interference to be resolved in the ordinary manner of compilers. If, on the other hand, the remaining set is not empty (determination step 414="No"), in block 416, the remainder becomes the new legal set for the low priority value and no interference edge is necessary.

If, in block 408, the compiler determines that both values are tagged as high priority, in block 418, the complier may select the intersection of legal sets for both value data structures. In block 420, the complier may partition the intersection into sets of roughly even size. In block 422, the complier may subtract one partition from one value and subtract the other partition from the other value. In determination block 424, the compiler may determine if either new legal set will be empty as a result of the subtraction operation. If the legal set is empty (determination block 424="Yes"), in block 410, the compiler may insert an interference edge and leave the legal sets unchanged. This relegates resolution to the ordinary methods of the compiler. If, on the other hand, both new sets are not empty as a result of the subtraction operation (determination block 424="No"), in block 426 the compiler may use the new legal sets and determine that no interference is necessary. Compilation of the code then proceeds in the ordinary manner.

In block 428, the operations of the aspect method 400 may be repeated for additional values or the compiler operations may continue. It should be understood that the processes of identifying contemporaneous values, determining whether overlaps exist, and addressing overlaps in the value register legal sets may be accomplished in a combined process. The various aspect processes may also include one or more loops enabling the process to address all value data structures within the compiled code. Some of such loops are illustrated, but more complicated and recursive loops may be implemented than illustrated.

While the above description evaluates just two levels of priority (i.e., high and low), in an aspect, multiple levels of priority (e.g., high/medium/low, scale of 1 to 5, etc.) may be used. In an aspect, multiple levels of priority may be implemented by executing the relative tests and allocations in sequence (e.g., such as high trumps medium and low, and medium trumps low, etc.).

It should be appreciated that the assignment of priority tags to value data structures may be made at the time the value is identified in the compilation process, and not at the end of processes that identify values. Thus, the steps of tagging values may be accomplished throughout early passes of the compiler, and not just prior to identifying and resolving interferences. It should also be appreciated that the processes of identifying and addressing overlaps in the value register legal sets may be accomplished as contemporaneous values are identified, and not in a combined process.

One of the advantages of the aspects discussed herein is that they allow the compiler developer to choose which types of values get advantaged in the comparisons made in the register to value allocation process, while simultaneously decreasing the size of the interference graph, and speeding up the compiler. For instance the compiler writer can identify values which are defined or used by specific instructions to be high priority, and therefore to get preferred access to the locations that they want.

Figure 5:
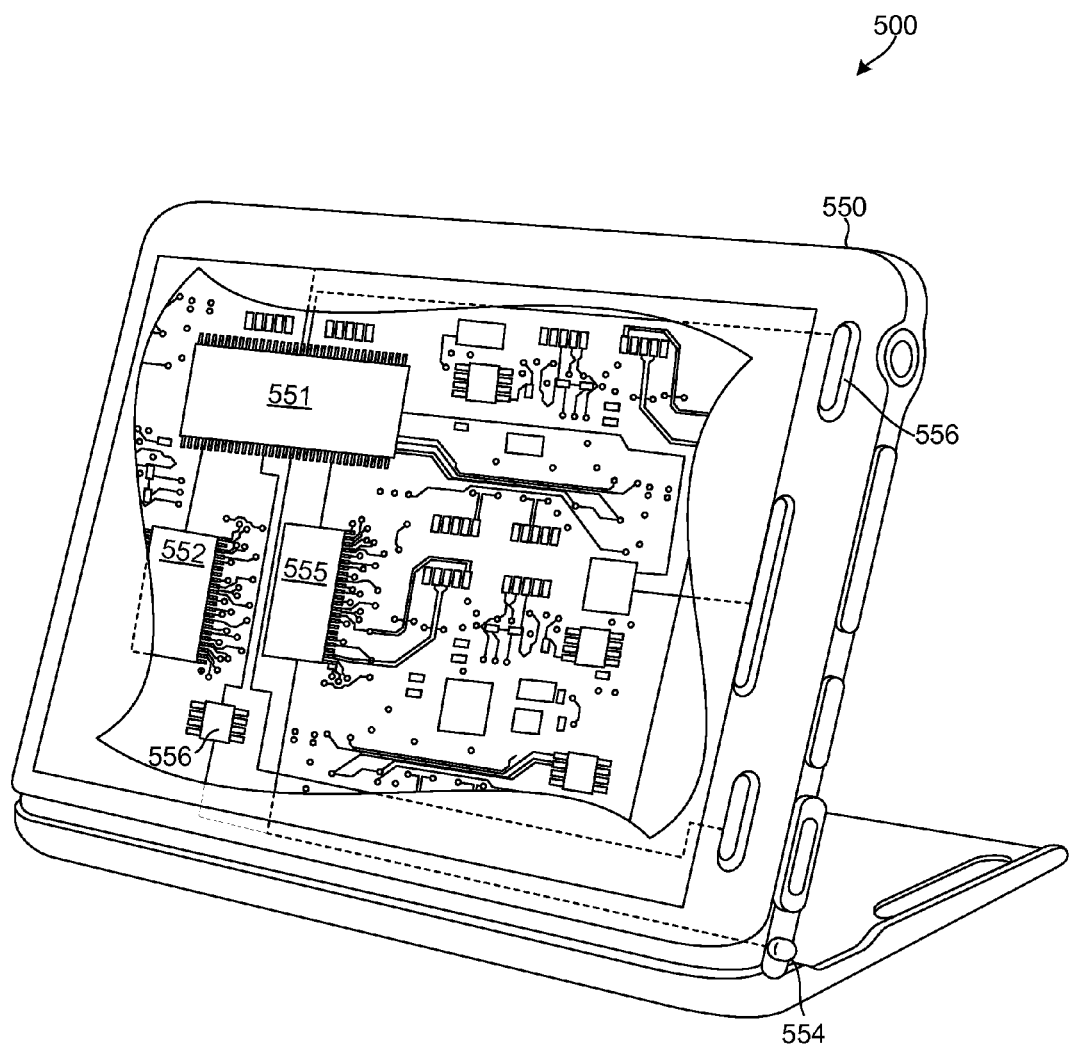
FIG. 5 is a component block diagram of a mobile device suitable for use with the various aspects.

Typical mobile devices 500 suitable for use with the various aspects will have in common the components illustrated in FIG. 5. For example, an exemplary mobile receiver device 500 may include a processor 551 coupled to internal memory 552, a display 550, and to a speaker 556. Additionally, the mobile device 500 may have an antenna 554 for sending and receiving electromagnetic radiation that is connected to a mobile multimedia receiver 555 coupled to the processor 551. In some aspects, the mobile multimedia receiver 555 may include an internal processor, such as a digital signal processor (DSP) for controlling operations of the receiver 555 and communicating with the device processor 551. Mobile devices typically also include a key pad or miniature keyboard and menu selection buttons or rocker switches for receiving user inputs.

The processor 551 may be any programmable microprocessor, microcomputer or multiple processor chip or chips that can be configured by processor-executable software instructions (applications) to perform a variety of functions, including the functions of the various aspects described herein. Typically, software applications and processor-executable instructions may be stored in the internal memory 552 before they are accessed and loaded into the processor 551. The processor 551 may include internal memory sufficient to store the application software instructions. In some mobile devices, a secure memory 556 may be in a separate memory chip coupled to the processor 551. In many mobile devices 500, the internal memory 552 may be a volatile or nonvolatile memory, such as flash memory, or a mixture of both. For the purposes of this description, a general reference to memory refers to all memory accessible by the processor 551, including internal memory 552, removable memory plugged into the mobile device, and memory within the processor 551 itself.

Figure 6:
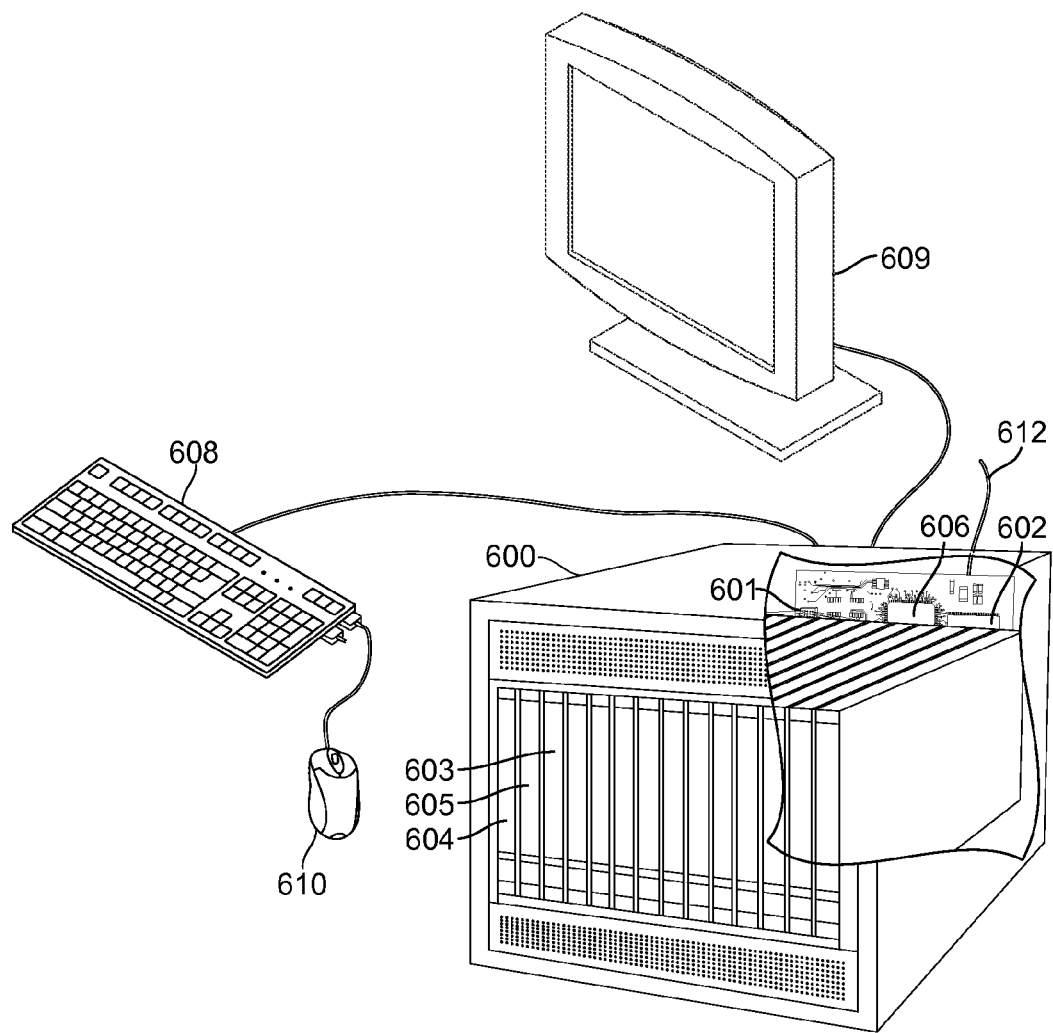
FIG. 6 is a component block diagram of a work station suitable for use with the various aspects.

The various aspects involving static compilers may be implemented on any of a variety of commercially available computers, servers and/or work stations, such as the work station 600 illustrated in FIG. 6. Such a work station 600 typically includes a processor 601 coupled to volatile memory 602 and a large capacity nonvolatile memory, such as a disk drive 603. The work station 600 may also include a floppy disc drive, compact disc (CD) or DVD disc drive 604 coupled to the processor 601. The work station 600 may also include network access ports 606 coupled to the processor 601 for establishing data connections with a network 612, such as a local area network coupled to other broadcast system computers and servers. Work stations 600 may also include operator interfaces, such as a keyboard 608, pointer device (e.g., a computer mouse 610), and a display 609.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), a DSP within a multimedia broadcast receiver chip, an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for allocating storage locations to variables while compiling code for a computing system, comprising:
    identifying a first variable associated with a code segment within code being compiled;
    assigning a first priority tag to the first variable;
    identifying a second variable associated with another code segment within the code being compiled;
    assigning a second priority tag to the second variable;
    using the assigned priority tags in assigning storage locations to the first and second variables;
        wherein using the assigned priority tags in assigning storage locations to the first and second variables comprises:
        determining whether the first and second variable are contemporaneously live during execution of the compiled code;
        determining whether legal storage location sets for the first and second variables overlap when it is determined that the first and second variable are contemporaneously live during execution of the compiled code;
        comparing the priority tags assigned to each of the first and second variables when it is determined that the first and second variables are contemporaneously live during execution of the compiled code and have overlapping legal storage location sets; and
        subtracting, when the first and second variables have different priority tags, the legal storage location set of the higher priority variable from the legal storage location set of the lower priority variable to obtain a remainder set of storage locations;
        determining whether the remainder set of storage locations is empty;
        assigning the remainder set of storage locations to the variable with the lower priority tag as a new legal parameter set and proceeding with compiler operations when the remainder storage location set is not empty; and
        inserting an interference edge in an interference graph and proceeding with the compiler operations when the remainder set of storage locations is empty.

2. The method of claim 1, further comprising:
    inserting an interference edge in an interference graph and proceeding with compiler operations when the first and second variables both have low priority tags.

3. The method of claim 1, further comprising:
    determining an intersection set of legal storage locations common to both the first and second variables when the first and second variables both have high priority tags; and
    partitioning the intersection set of legal storage locations approximately equally between the first and second variables into a first partition set for the first variable and a second partition set for the second variable.

4. The method of claim 3, further comprising:
    subtracting the first partition set from the legal partition set of the second variable to obtain a first remainder set;
    subtracting the second partition set from the legal partition set of the first variable to obtain a second remainder set;
    determining whether the first remainder set is empty; and
    determining whether the second remainder set is empty.

5. The method of claim 3, further comprising:
    inserting an interference edge in an interference graph and proceeding with compiler operations when either of the first or second remainder sets is empty.

6. The method of claim 4, further comprising:
    assigning the first remainder set to the first variable as a new legal storage location set;
    assigning the second remainder set to the first variable as another new legal storage location set; and
    proceeding with compiler operations when both of the first and second remainder sets are not empty.

7. The method of claim 1, wherein identifying a first variable associated with a code segment within code being compiled comprises identifying a first variable associated with a code segment within code being compiled by a runtime compiler.

8. The method of claim 1, wherein identifying a first variable associated with a code segment within code being compiled comprises identifying a first variable associated with a code segment within code being compiled by a static compiler.

9. A computing device configured to allocate storage locations to variables while compiling code, comprising:
    a memory;
    a processor;
    means for identifying a first variable associated with a code segment within code being compiled;
    means for assigning a first priority tag to the first variable;
    means for identifying a second variable associated with another code segment within the code being compiled;
    means for assigning a second priority tag to the second variable;
    means for using the assigned priority tags in assigning storage locations to the first and second variables;
        wherein means for using the assigned priority tags in assigning storage locations to the first and second comprises:
        means for determining whether the first and second variable are contemporaneously live during execution of the compiled code;

means for determining whether legal storage location sets for the first and second variables overlap when it is determined that the first and second variable are contemporaneously live during execution of the compiled code;

means for comparing the priority tags assigned to each of the first and second variables when it is determined that the first and second variables are contemporaneously live during execution of the compiled code and have overlapping legal storage location sets; and means for subtracting, when the first and second variables have different priority tags, the legal storage location set of the higher priority variable from the legal storage location set of the lower priority variable to obtain a remainder set of storage locations;

means for determining whether the remainder set of storage locations is empty;

means for assigning the remainder set of storage locations to the variable with the lower priority tag as a new legal parameter set and proceeding with compiler operations when the remainder set of storage locations is not empty; and means for inserting an interference edge in an interference graph and proceeding with the compiler operations when the remainder set of storage locations is empty.

10. The computing device of claim 9, further comprising:
means for inserting an interference edge in an interference graph and proceeding with compiler operations when the first and second variables both have low priority tags.

11. The computing device of claim 9, further comprising:
means for determining an intersection set of legal storage locations common to both the first and second variables when the first and second variables both have high priority tags; and means for partitioning the intersection set of legal storage locations approximately equally between the first and second variables into a first partition set for the first variable and a second partition set for the second variable.

12. The computing device of claim 11, further comprising:
means for subtracting the first partition set from the legal partition set of the second variable to obtain a first remainder set;

means for subtracting the second partition set from the legal partition set of the first variable to obtain a second remainder set;

means for determining whether the first remainder set is empty; and means for determining whether the second remainder set is empty.

13. The computing device of claim 12, further comprising:
means for inserting an interference edge in an interference graph and proceeding with compiler operations when either of the first or second remainder sets is empty.

14. The computing device of claim 12, further comprising:
means for assigning the first remainder set to the first variable as a new legal storage location set;

means for assigning the second remainder set to the first variable as another new legal storage location set; and means for proceeding with compiler operations when both of the first and second remainder sets are not empty.

15. The computing device of claim 9, wherein means for identifying a first variable associated with a code segment within code being compiled comprises means for identifying a first variable associated with a code segment within code being compiled by a runtime compiler.

16. The computing device of claim 9, wherein means for identifying a first variable associated with a code segment within code being compiled comprises means for identifying a first variable associated with a code segment within code being compiled by a static compiler.

17. A non-transitory computer readable storage medium having stored thereon processor-executable software instructions configured to cause a processor to perform operations for allocating storage locations to variables while compiling code, the operations comprising:

identifying a first variable associated with a code segment within code being compiled;

assigning a first priority tag to the first variable;

identifying a second variable associated with another code segment within the code being compiled; assigning a second priority tag to the second variable; and using the assigned priority tags in assigning storage locations to the first and second variables;

wherein using the assigned priority tags in assigning storage locations to the first and second variables comprises:

determining whether the first and second variable are contemporaneously live during execution of the compiled code;

determining whether legal storage location sets for the first and second variables overlap when it is determined that the first and second variable are contemporaneously live during execution of the compiled code;

comparing the priority tags assigned to each of the first and second variables when it is determined that the first and second variables are contemporaneously live during execution of the compiled code and have overlapping legal storage location sets; and subtracting, when the first and second variables have different priority tags, the legal storage location set of the higher priority variable from the legal storage location set of the lower priority variable to obtain a remainder set of storage locations;

determining whether the remainder set of storage locations is empty;

assigning the remainder set of storage locations to the variable with the lower priority tag as a new legal parameter set and proceeding with compiler operations when the remainder set of storage locations is not empty; and inserting an interference edge in an interference graph and proceeding with the compiler operations when the remainder set of storage locations is empty.

18. The non-transitory computer readable storage medium of claim 17, wherein the stored processor-executable instructions are configured to cause a processor to perform operations further comprising:

inserting an interference edge in an interference graph and proceeding with compiler operations when the first and second variables both have low priority tags.

19. The non-transitory computer readable storage medium of claim 17, wherein the stored processor-executable instructions are configured to cause a processor to perform operations further comprising:

determining an intersection set of legal storage locations common to both the first and second variables when the first and second variables both have high priority tags; and partitioning the intersection set of legal storage locations approximately equally between the first and second variables into a first partition set for the first variable and a second partition set for the second variable.

20. The non-transitory computer readable storage medium of claim 19, wherein the stored processor-executable instructions are configured to cause a processor to perform operations further comprising:
subtracting the first partition set from the legal partition set of the second variable to obtain a first remainder set;
subtracting the second partition set from the legal partition set of the first variable to obtain a second remainder set;
determining whether the first remainder set is empty; and
determining whether the second remainder set is empty.

21. The non-transitory computer readable storage medium of claim 20, wherein the processor is configured with processor-executable instructions to perform operations further comprising:
inserting an interference edge in an interference graph and proceeding with compiler operations when either of the first or second remainder sets is empty.

22. The non-transitory computer readable storage medium of claim 20, wherein the stored processor-executable instructions are configured to cause a processor to perform operations further comprising:
assigning the first remainder set to the first variable as a new legal storage location set;
assigning the second remainder set to the first variable as another new legal storage location set; and
proceeding with compiler operations when both of the first and second remainder sets are not empty.

23. The non-transitory computer readable storage medium of claim 17, wherein the stored processor-executable instructions are configured to cause a processor to perform operations such that identifying a first variable associated with a code segment within code being compiled comprises identifying a first variable associated with a code segment within code being compiled by a runtime compiler.

24. The non-transitory computer readable storage medium of claim 17, wherein the stored processor-executable instructions are configured to cause a processor to perform operations such that identifying a first variable associated with a code segment within code being compiled comprises identifying a first variable associated with a code segment within code being compiled by a static compiler.

25. A computing device, comprising:
a memory;
and a processor coupled to the computing device and the memory, wherein the processor is configured with processor-executable instructions to perform operations comprising:
identifying a first variable associated with a code segment within code being compiled;
assigning a first priority tag to the first variable;
identifying a second variable associated with another code segment within the code being compiled;
assigning a second priority tag to the second variable;
using the assigned priority tags in assigning storage locations to the first and second variables;
wherein using the assigned priority tags in assigning storage locations to the first and second variables comprises:
determining whether the first and second variable are contemporaneously live during execution of the compiled code;
determining whether legal storage location sets for the first and second variables overlap when it is determined that the first and second variable are contemporaneously live during execution of the compiled code;
comparing the priority tags assigned to each of the first and second variables when it is determined that the first and second variables are contemporaneously live during execution of the compiled code and have overlapping legal storage location sets; and
subtracting, when the first and second variables have different priority tags, the legal storage location set of the higher priority variable from the legal storage location set of the lower priority variable to obtain a remainder set of storage locations;
determining whether the remainder set of storage locations is empty;
assigning the remainder set of storage locations to the variable with the lower priority tag as a new legal parameter set and proceeding with compiler operations when the remainder set of storage locations is not empty; and
inserting an interference edge in an interference graph and proceeding with the compiler operations when the remainder set of storage locations is empty.

26. The computing device of claim 25, wherein the processor is configured with processor-executable instructions to perform operations further comprising:
inserting an interference edge in an interference graph and proceeding with compiler operations when the first and second variables both have low priority tags.

27. The computing device of claim 25, wherein the processor is configured with processor-executable instructions to perform operations further comprising:
determining an intersection set of legal storage locations common to both the first and second variables when the first and second variables both have high priority tags; and
partitioning the intersection set of legal storage locations approximately equally between the first and second variables into a first partition set for the first variable and a second partition set for the second variable.

28. The computing device of claim 27, wherein the processor is configured with processor-executable instructions to perform operations further comprising:
subtracting the first partition set from the legal partition set of the second variable to obtain a first remainder set;
subtracting the second partition set from the legal partition set of the first variable to obtain a second remainder set;
determining whether the first remainder set is empty; and
determining whether the second remainder set is empty.

29. The computing device of claim 28, wherein the processor is configured with processor-executable instructions to perform operations further comprising:
inserting an interference edge in an interference graph and proceeding with compiler operations when either of the first or second remainder sets is empty.

30. The computing device of claim 28, wherein the processor is configured with processor-executable instructions to perform operations further comprising:
assigning the first remainder set to the first variable as a new legal storage location set;
assigning the second remainder set to the first variable as another new legal storage location set; and
proceeding with compiler operations when both of the first and second remainder sets are not empty.

31. The computing device of claim 25, wherein the processor is configured with processor-executable instructions such that identifying a first variable associated with a code segment within code being compiled comprises identifying a first variable associated with a code segment within code being compiled by a runtime compiler.

32. The computing device of claim 25, wherein the processor is configured with processor-executable instructions such that identifying a first variable associated with a code segment within code being compiled comprises identifying a first variable associated with a code segment within code being compiled by a static compiler.

\* \* \* \* \*